US010600314B1

(12) United States Patent
Manku et al.

(10) Patent No.: US 10,600,314 B1
(45) Date of Patent: Mar. 24, 2020

(54) MODIFYING SENSITIVITY SETTINGS IN A MOTION DETECTION SYSTEM

(71) Applicant: Cognitive Systems Corp., Waterloo (CA)

(72) Inventors: Tajinder Manku, Waterloo (CA); Oleksiy Kravets, Petersburg (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 16/399,756

(22) Filed: Apr. 30, 2019

(51) Int. Cl.
G08B 21/00 (2006.01)
G08B 25/10 (2006.01)
G08B 29/18 (2006.01)
G08B 21/22 (2006.01)
G06K 9/00 (2006.01)
G08B 29/20 (2006.01)

(52) U.S. Cl.
CPC ......... *G08B 25/10* (2013.01); *G06K 9/00335* (2013.01); *G06K 9/00771* (2013.01); *G08B 21/22* (2013.01); *G08B 29/185* (2013.01); *G08B 29/20* (2013.01)

(58) Field of Classification Search
CPC ...... G08B 25/10; G08B 21/22; G08B 29/185; G08B 29/20; G06K 9/00335; G06K 9/00771
USPC .......................................................... 340/541
See application file for complete search history.

(56) References Cited

U.S. PATENT DOCUMENTS

| 4,054,879 A | 10/1977 | Wright et al. |
| 4,636,774 A * | 1/1987 | Galvin ................. G08B 13/181 307/117 |
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |

(Continued)

FOREIGN PATENT DOCUMENTS

| CA | 2834522 | 5/2014 |
| CA | 2945702 | 8/2015 |

(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Mark S Rushing
(74) *Attorney, Agent, or Firm* — Henry Patent Law Firm PLLC

(57) ABSTRACT

In a general aspect, a sensitivity setting is adjusted in a motion detection system. In some aspects, a user interface is provided by a motion detection system, and user input data is obtained through the user interface. A wireless communication link is identified based on the user input data; the wireless communication link is provided by a first wireless communication device and a second wireless communication device. Based on the user input data, a value is assigned to a sensitivity setting associated with the wireless communication link in the motion detection system. The motion detection system obtains data for motion detection based on wireless signals communicated through a space on the wireless communication link. Motion of an object in the space is detected based on the data and the value of the sensitivity setting.

29 Claims, 11 Drawing Sheets

(56) References Cited

U.S. PATENT DOCUMENTS

| | | |
|---|---|---|
| 6,075,797 A | 6/2000 | Thomas |
| 6,380,882 B1 | 4/2002 | Hegnauer |
| 6,573,861 B1 | 6/2003 | Hommel et al. |
| 6,914,854 B1 | 7/2005 | Heberley et al. |
| 7,652,617 B2 | 1/2010 | Kurtz et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,030,321 B2 | 5/2015 | Breed |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 2003/0108119 A1 | 6/2003 | Mohebbi et al. |
| 2005/0128067 A1* | 6/2005 | Zakrewski ............ G08B 29/20 340/511 |
| 2006/0152404 A1 | 7/2006 | Fullerton et al. |
| 2006/0284757 A1 | 12/2006 | Zemany |
| 2007/0296571 A1 | 12/2007 | Kolen |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1* | 5/2010 | Sridhara ................ G01S 19/49 455/456.1 |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2012/0115512 A1* | 5/2012 | Grainger ............ G01S 5/0257 455/456.3 |
| 2012/0146788 A1 | 6/2012 | Wilson et al. |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1* | 9/2015 | Tran .................. G08B 21/0446 340/539.12 |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2016/0018508 A1 | 1/2016 | Chen et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0203689 A1* | 7/2016 | Hintz ............... G08B 13/19608 348/155 |
| 2016/0210838 A1 | 7/2016 | Yan et al. |
| 2016/0262355 A1 | 9/2016 | Swan |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0126488 A1 | 5/2017 | Cordeiro et al. |
| 2017/0146656 A1 | 5/2017 | Belsley et al. |
| 2017/0155439 A1 | 6/2017 | Chang et al. |
| 2017/0195893 A1 | 7/2017 | Lee et al. |
| 2017/0223628 A1 | 8/2017 | Snyder et al. |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0180706 A1 | 6/2018 | Li et al. |
| 2018/0288587 A1 | 10/2018 | Allegue Martinez et al. |
| 2018/0330293 A1 | 11/2018 | Kulkarni et al. |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014/021574 | 2/2014 |
| WO | 2014/201574 | 12/2014 |
| WO | 2015/168700 | 11/2015 |
| WO | 2016005977 | 1/2016 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017177303 | 10/2017 |
| WO | 2017/210770 | 12/2017 |
| WO | 2018/094502 | 5/2018 |
| WO | 2019041019 | 3/2019 |

OTHER PUBLICATIONS

Domenico, et al, "Exploring Training Options for RF Sensing Using CSI", IEEE Communications Magazine, 2018, vol. 56, Issue 5, pp. 116-123, 8 pgs.

(56) References Cited

OTHER PUBLICATIONS

Iqbal, et al., "Indoor Motion Classification Using Passive RF Sensing Incorporating Deep Learning", ISSN: 2577-2465, Electronic IEEE, Jun. 3, 2018, 5 pgs.
Kosba, et al., "Robust WLAN Device-free Passive Motion Detection", IEEE Wireless Communications and Networking Conference, Apr. 2012, 6 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

* cited by examiner

MODIFYING SENSITIVITY SETTINGS IN A MOTION DETECTION SYSTEM

BACKGROUND

The following description relates to modifying sensitivity settings in a motion detection system.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1:
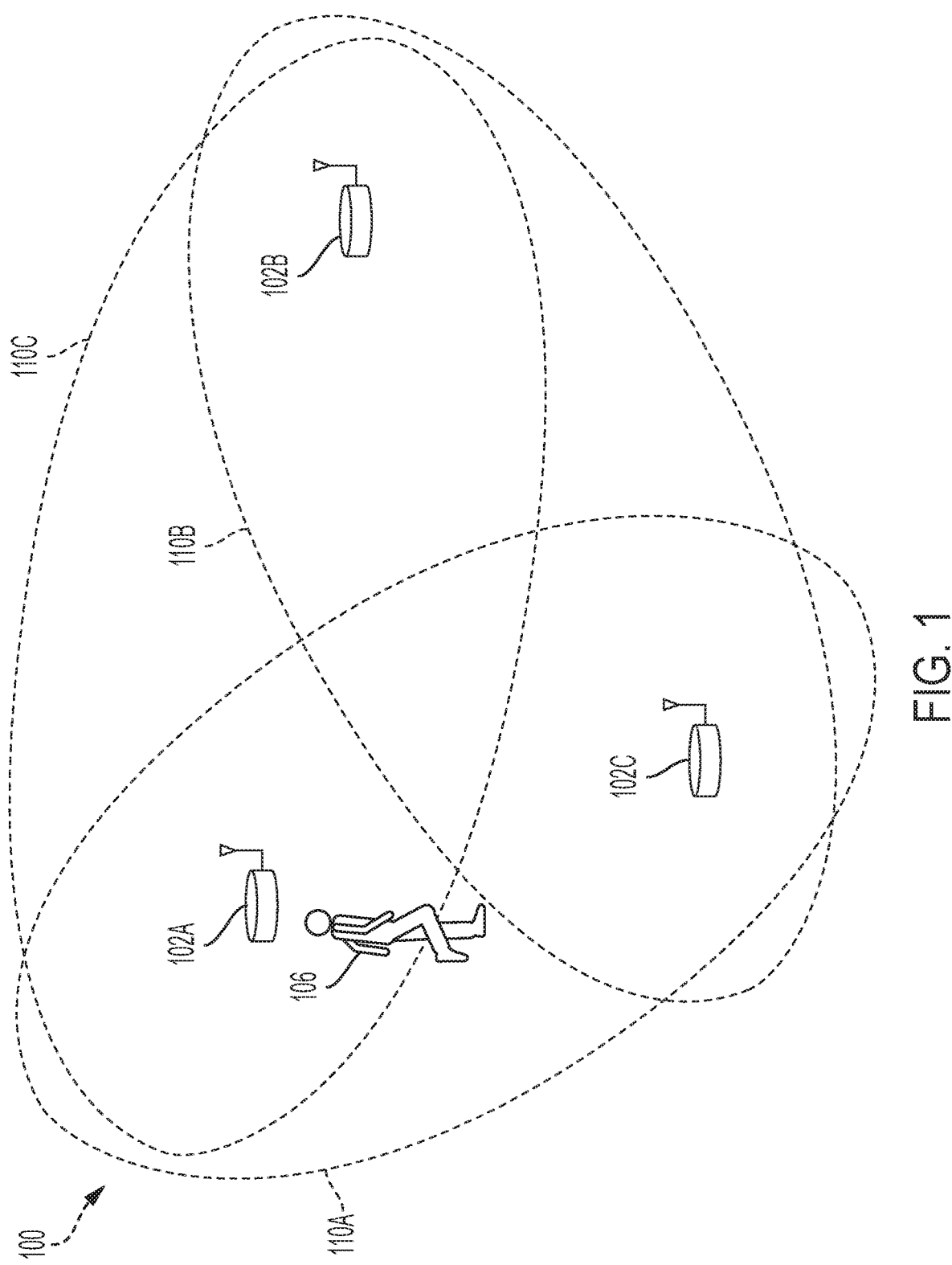
FIG. 1 is a diagram showing an example wireless communication system.

In some aspects of what is described here, a motion detection system controls sensitivity settings based on user input. For example, the motion detection system may use multiple wireless communication links to detect motion, and the sensitivity setting for an individual one of the wireless communication links can be adjusted based on the user input. In some implementations, the sensitivity settings for a group of wireless communication links can be adjusted based on the user input (e.g., the links associated with a particular device, associated with a false positive, etc.). The user input can be, for example, a sensitivity level selected directly by the user (e.g., through a control interface for sensitivity settings), feedback from the user about a motion detection event (e.g., indication of a false positive) or another type of user input.

In some examples, the motion detection system provides a graphical user interface that is displayed to a user on a mobile device (e.g., on a smartphone or tablet), and the graphical user interface allows the user to adjust the motion detection sensitivity setting associated with individual links or individual nodes in a wireless network. As an example, the user may reduce the motion detection sensitivity for wireless links that cover environments that produce some degree of motion that the user does not want the motion detection system to create notifications for. For instance, outdoor areas may present low degrees of motion due to wind or other factors that are not of interest to some users. As another example, the user may increase the motion detection sensitivity for wireless links that cover higher priority areas or areas where even slight motion would be of interest.

In some examples, the motion detection system provides a graphical user interface that is displayed to a user on a mobile device (e.g., on a smartphone or tablet), and the graphical user interface allows the user to provide feedback to the motion detection system. For instance, the user interface may allow the user to indicate whether a detected motion event was a false positive (no motion, or a type of motion that the user does not want the motion detection system to report), and the motion detection system may automatically decrease the motion detection sensitivity for one or more wireless links that provided the data that produced the false positive. In some cases, when multiple wireless links provide data that produces a false positive, the motion detection sensitivity for each of the wireless links can be adjusted in proportion to the degree of false motion detected on the wireless link.

In some instances, aspects of the systems and techniques described here provide technical improvements and advantages over existing approaches. For example, the accuracy of motion detection and localization of the motion within the space served by the motion detection system may be improved. As another example, users may be provided a higher degree of control over the sensitivity of the motion detection system. For instance, users may be able to provide input that makes the motion detection system more or less sensitive to certain types of motion or to motion in certain locations. Thus, a motion detection system can be made to better serve an individual user, environment or application.

In some instances, wireless signals received at each of the wireless communication devices in a wireless communication network may be analyzed to determine channel information for the different communication links in the network (between respective pairs of wireless communication devices in the network). The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to detect whether motion has occurred in the space, to determine a relative location of the detected motion, or both. In some aspects, the channel information for each of the communication links may be analyzed to detect whether an object is present or absent, e.g., when no motion is detected in the space.

Example motion detection and localization algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," and other techniques.

FIG. 1 illustrates an example wireless communication system 100. The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the moving object's movement to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes detected in the communication channel. In some cases, another device (e.g., a remote server, a network-attached device, etc.) is configured to perform one or more operations of the motion detection system. For example, each wireless communication device 102 may send channel information to central device or system that performs operations of the motion detection system.

In an example aspect of operation, wireless communication devices 102A, 102B may broadcast wireless signals or address wireless signals to other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of the example process 600 described with respect to FIG. 6, or another type of process for detecting motion.

Figure 2A:
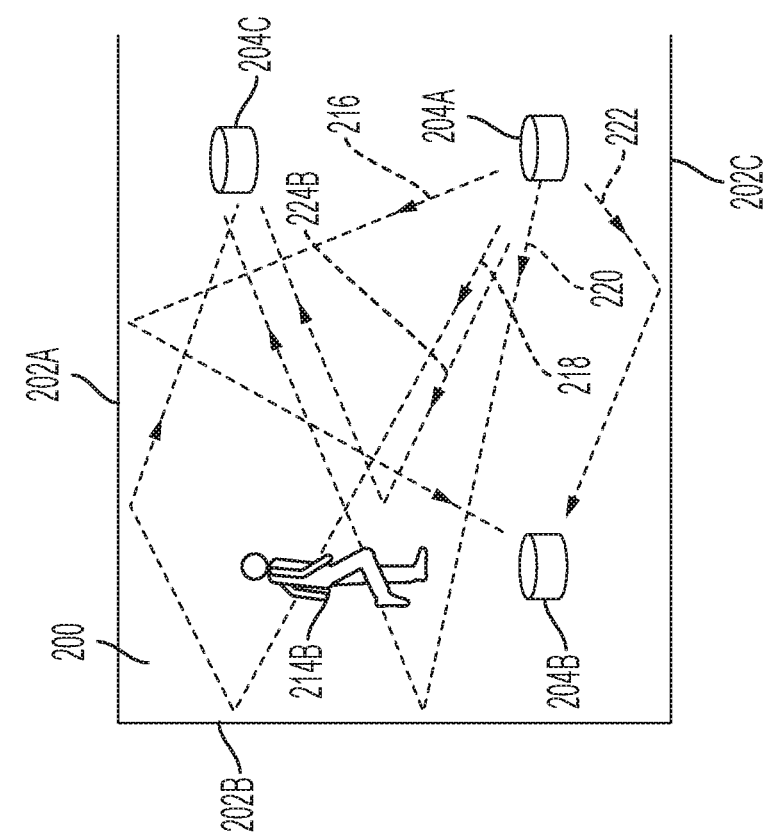
FIGS. 2A-2B are diagrams showing example wireless signals communicated between wireless communication devices.
Figure 2B:
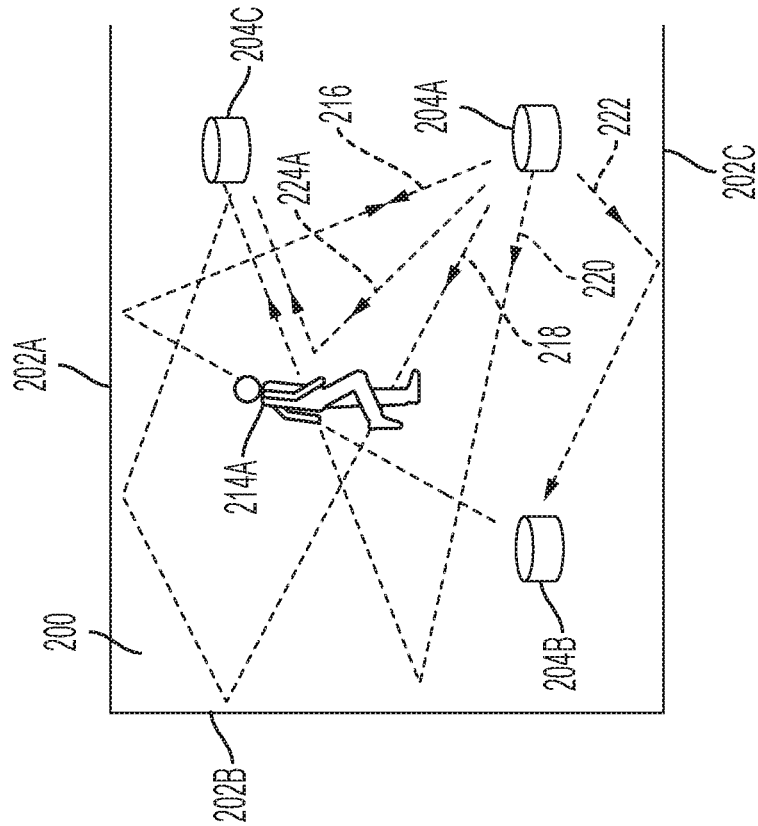

FIGS. 2A and 2B are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. When the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—will not change.

Mathematically, a transmitted signal f(t) transmitted from the first wireless communication device 204A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \qquad (4)$$

The received signal R at a wireless communication device can then be analyzed, for example, to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \qquad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response may indicate lack of movement. Thus, in some implementations, the complex values $Y_n$ for each of multiple devices in a wireless network can be processed to detect whether motion has occurred in a space traversed by the transmitted signals f(t).

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 3:
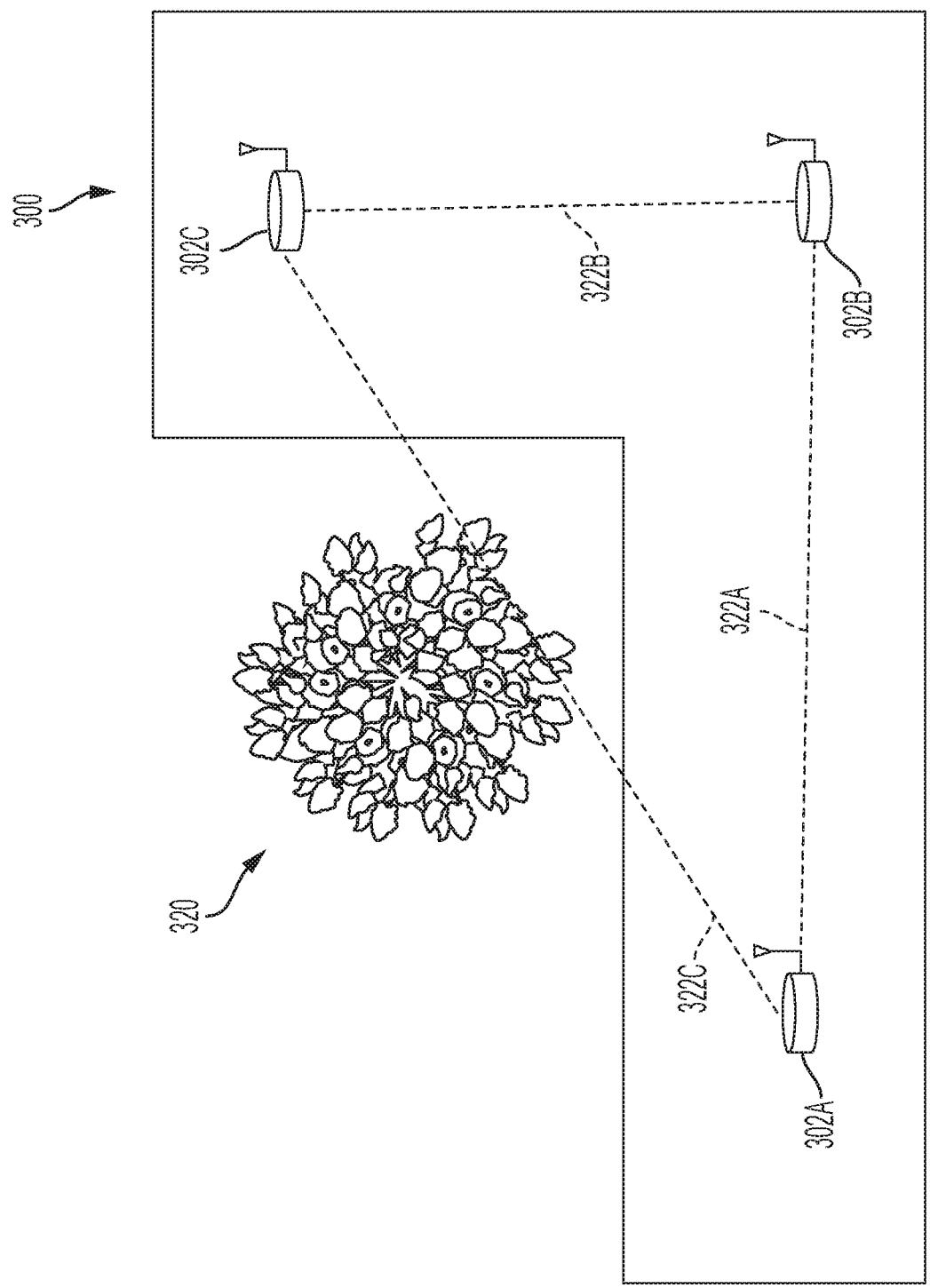
FIG. 3 is a diagram showing an example wireless communication system having wireless communication links that traverse different types of physical environments.

FIG. 3 is a diagram showing an example wireless communication system 300 that includes wireless communication links 322A, 322B, 322C that traverse different types of physical environments. Each of the wireless communication links shown in FIG. 3 is provided by a respective pair of wireless communication devices 302A, 302B, 302C. In particular, the wireless communication link 322A is provided by wireless communication devices 302A, 302B; the wireless communication link 322B is provided by wireless communication devices 302B, 302A; and the wireless communication link 322C is provided by wireless communication devices 302C, 302A.

The wireless communication devices 302A, 302B, 302C may include one or more Wi-Fi routers, one or more mobile devices (e.g., smartphones, tablets, laptops, smart watches, etc.), one or more installed wireless devices (e.g., smart thermostat, Wi-Fi camera, Wi-Fi doorbell, etc.) or other types of devices that communicate wirelessly. The wireless communication devices 302A, 302B, 302C communicate with each other on the wireless communication links 322A, 322B, 322C using wireless signals, for example, radio-frequency signals communicated according to a wireless communication protocol. For instance, the wireless communication devices 302A, 302B, 302C may communicate according to a Wi-Fi protocol or another type of wireless network standard.

Signals communicated between the devices on the wireless communication links 322A, 322B, 322C may be used by a motion detection system to detect motion of objects in the physical environment of the wireless communication system 300. For instance, the wireless communication devices 302A, 302B, 302C may be used by a motion detection system, for example, as described with respect to the wireless communication devices 102A, 102B, 102C shown in FIG. 1 or otherwise.

In the example shown in FIG. 3, the wireless communication devices 302A, 302B, 302C reside inside a structure (e.g., building, home or another type of structure) that is generally L-shaped. Due to the shape of the structure and the relative locations of the wireless communication devices 302A, 302B, 302C, the wireless communication links 322A, 322B, 322B traverse different types of physical environments. In particular, the wireless communication links 322A, 322B include indoor signal paths, and the wireless communication link 322C includes an outdoor signal path.

When the wireless communication devices 302A, 302B, 302C are used for motion detection, each of the wireless communication links 322A, 322B, 322C may detect motion in different (potentially overlapping) zones. For example, the wireless communication link 322A may detect motion primarily in one section of the L-shaped structure, while the wireless communication link 322B may detect motion primarily in the other section of the L-shaped structure; and the wireless communication link 322C may detect motion primarily in the outdoor area between the sections of the L-shaped structure.

As shown in FIG. 3, a tree 320 resides between the wireless communication devices 302C, 302A and obstructs a direct signal path of the wireless communication link 322C. In some instances, the natural movement of the tree 320 (e.g., due to wind, etc.) may be detected by the motion detection system based on wireless signals communicated on the wireless communication link 322C. Thus, motion of the tree 320 may trigger an alert or notification in the motion detection system.

In the example shown, the motion detection system can be configured to reduce sensitivity to natural motion of the tree 320, while maintaining high sensitivity to motion within the L-shaped structure. For example, a user of the motion detection system may want to avoid alerts or notifications based on false motion detection events (e.g., movement of the tree 320 due to wind). In such cases, the user may provide input to the motion detection system to reduce sensitivity to motion detected by the wireless communication link 322C.

In some implementations, the user can inform the motion detection system that a motion detection event was true or false. For instance, when the motion detection system alerts the user of a motion detection event, the motion detection system may provide a user interface that allows the user to indicate (e.g., through a widget or otherwise) whether the motion detection event was true (e.g., motion of the type that the user wants to receive notifications for) or false (e.g., not the type of motion that the user wants to receive notifications for). An example of such a user interface is shown in FIG. 5E. In such cases, the motion detection system can reduce the motion sensitivity of the wireless communication links that detected the false motion, increase the motion sensitivity of the wireless communication links that detected the true motion, or both. For instance, if the wireless communication link 322C detects motion of the tree 320 and the user indicates a false motion detection event, the motion detection system can reduce motion sensitivity associated with the wireless communication link 322C.

In some implementations, the user can directly adjust the sensitivity level of individual wireless communication links. For instance, the motion detection system may provide a user interface (e.g., to be displayed on a mobile device, computer screen, etc.) that associates each individual wireless communication link with a control widget (e.g., a slider, a dial, etc.), and the control widgets may allow the user increase or decrease the sensitivity setting for each individual link. In the example shown in FIG. 3, the user may reduce the sensitivity level for the wireless communication link 322C that covers the tree 320 and/or increase the sensitivity level for the wireless communication links 322A, 322B that cover the indoor area.

In some implementations, the user can directly adjust the sensitivity level of wireless communication devices. For instance, the motion detection system may provide a user interface that associates each individual wireless communication device (e.g., each node in the network) with a control widget (e.g., a slider, a dial, etc.), and the control widgets may allow the user increase or decrease the sensitivity setting for the links provided by each individual device. An example of such a user interface is shown in FIG. 5B. In the example shown in FIG. 3, the user may increase the sensitivity level for the wireless communication device 302B that primarily covers indoor zones and/or decrease the sensitivity level for the wireless communication devices 302A, 302C that cover more of the outdoor area. For instance, the user may reduce sensitivity for devices installed outdoors (e.g., an outdoor Wi-Fi camera, an outdoor smart TV, etc.)

In some cases, the wireless communication system 300 includes additional or different wireless communication links that can be used for motion detection, and the user can provide input to adjust the sensitivity setting for some or all of the wireless communication links. In the example shown, each pair of the wireless communication devices 302A, 302B, 302C has a single wireless communication link. In some cases, each pair of the wireless communication devices 302A, 302B, 302C can have multiple wireless communication links. For instance, a pair of wireless communication devices may have distinct wireless communication links for distinct protocols (e.g., Wi-Fi, Bluetooth, etc.), for distinct channels (e.g., coded channels, frequency channels), for transmitting and receiving (e.g., each device as transmitter and receiver), for distinct physical components (e.g., antenna pairs, etc.), or for other purposes. Moreover, wireless communication links may be provided by a wide range of wireless network topologies.

Figure 4:
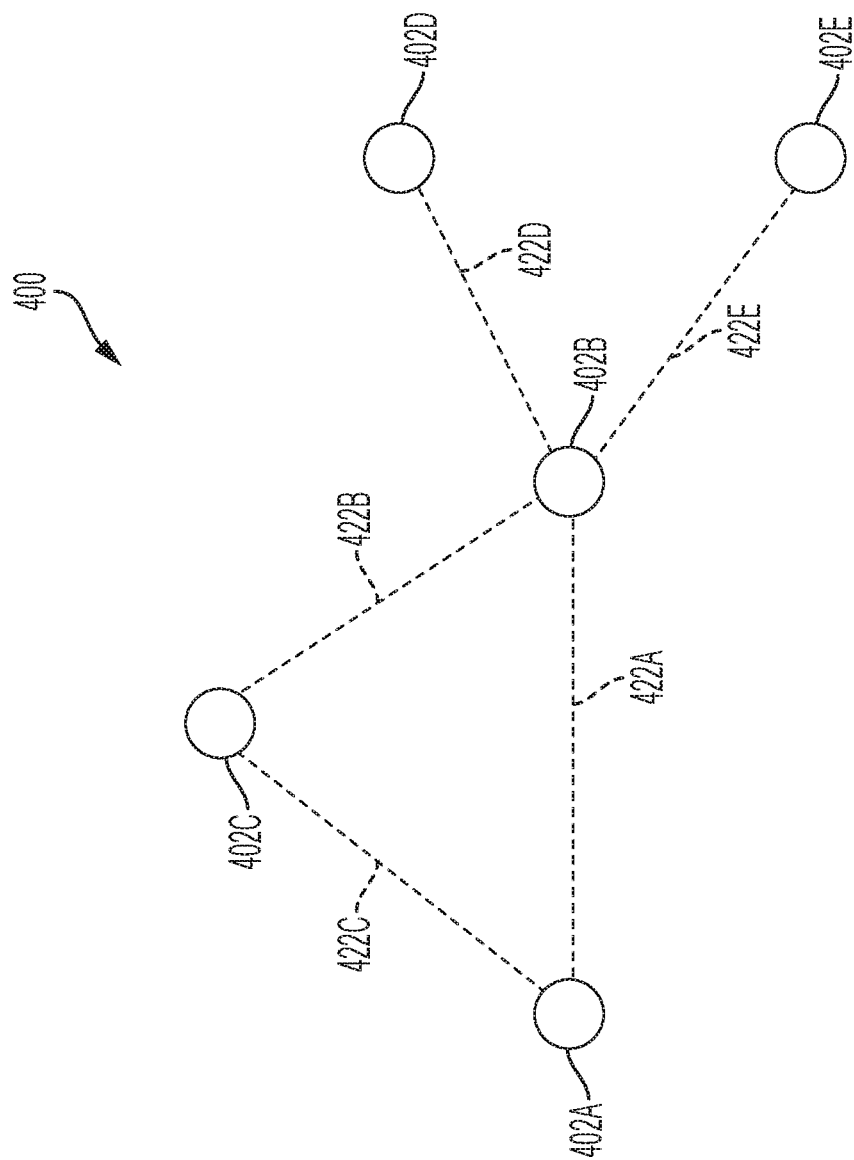
FIG. 4 is a diagram showing nodes and links in an example wireless communication system.

FIG. 4 is a diagram showing nodes and links in an example wireless communication network 400. The example wireless communication network 400 includes four nodes 402A, 402B, 402C, 402D, 402E and five links 422A, 422B, 422C, 422D, 422E provided by pairs of the nodes. The wireless communication network 400 may include additional or different types of nodes and links. For example, each pair of nodes may have one or more links in the wireless communication network 400.

In the example shown in FIG. 4, each of the nodes in the wireless communication network 400 may correspond to a wireless communication device (e.g., similar to the wireless communication devices 302A, 302B, 302C shown in FIG. 3 or otherwise), and each of the links in the wireless communication network 400 may correspond to a wireless communication link (e.g., similar to the wireless communication links 322A, 322B, 322C shown in FIG. 3 or otherwise) provided by a respective pair of the wireless communication devices.

In some implementations of the wireless communication network 400 shown in FIG. 4, some of the nodes are wireless access points or routers, and some of the nodes are leaf nodes. For instance, the nodes 402A, 402B, 402C can be implemented as wireless access points (APs) in a mesh network, while the nodes 402D, 402E can be implemented as wireless devices (e.g., mobile devices, smart devices, etc.) that access the mesh network through one or more of the APs. As an example, the wireless network may be installed in a home, and node 402A may represent an AP installed in the entry of the home, node 402B may represent an AP installed in the kitchen, node 402C may represent an AP installed in the bedroom, and the nodes 402D, 402E may be leaf nodes (e.g., a Wi-Fi enabled camera and a smart TV) that access the wireless network through node 402B (the AP installed in the kitchen).

In some instances, a motion detection system uses data from wireless signals exchanged over one or more of the links 422A, 422B, 422C, 422D, 422E to detect motion of objects in the physical environment of the wireless communication network 400. For example, the motion detection system may collect data from the wireless communication network 400 to detect motion in or around a home where the wireless network is installed.

In some instances, the motion detection system also provides a user interface that allows a user to control (e.g., directly or indirectly) the sensitivity settings of the motion detection system. For example, the motion detection system have a sensitivity setting associated with each of the links 422A, 422B, 422C, 422D, 422E, and the user input may be used to adjust the sensitivity settings.

FIGS. 5A, 5B, 5C, 5D and 5E are diagrams showing example user interfaces 500, 520, 540, 560, 580 provided by a motion detection system. The example user interfaces shown in FIGS. 5A, 5B, 5C, 5D and 5E are graphical user interfaces provided for display on a mobile device (e.g., a smartphone, a tablet, etc.). In some cases, a motion detection system provides user interfaces for display on other types of devices (e.g., a smart watch, in a browser on a laptop or desktop computer, etc.).

The example user interfaces 500, 520, 540, 560, 580 are provided for a motion detection system that uses the example network topology shown in FIG. 4, according to the example implementation (described above) in which the nodes 402A, 402B, 402C are wireless access points of a wireless mesh network for a home environment with the APs located at an entry, kitchen and bedroom, and the nodes 402D, 402E are leaf nodes that access the wireless mesh network through one or more of the APs.

The example user interfaces 500, 520, 540, 560, 580 are modules provided by the motion detection system for visual display (e.g., to a user) on a display device (e.g., a display element of a mobile device). For example, the motion detection system may send the user interfaces (e.g., over a wireless communication link) to the mobile device, and the mobile device can receive the user interfaces and display them on a display element (e.g., a touchscreen) of the mobile device. The mobile devices then receive user input through the user interfaces (e.g., based on a user's interaction with the touchscreen) and send the associated user input data to the motion detection system. For example, the mobile device may generate user input data based on user input provided through one or more of the interface elements shown in FIGS. 5A, 5B, 5C, 5D, 5E. Generally, other types of user interfaces may be provided by a motion detection system to collect the same type of user input shown in the examples, or to collect additional or different types of user input. The motion detection system may then process the user input data and perform further operations (e.g., modifying the motion detection system, sending a response to the mobile device, etc.). As an example, the user input data collected through the user interfaces 500, 520, 540, 560, 580 may be utilized in one or more of the operations in the example process 600 shown in FIG. 6 or in another manner.

Figure 5A:
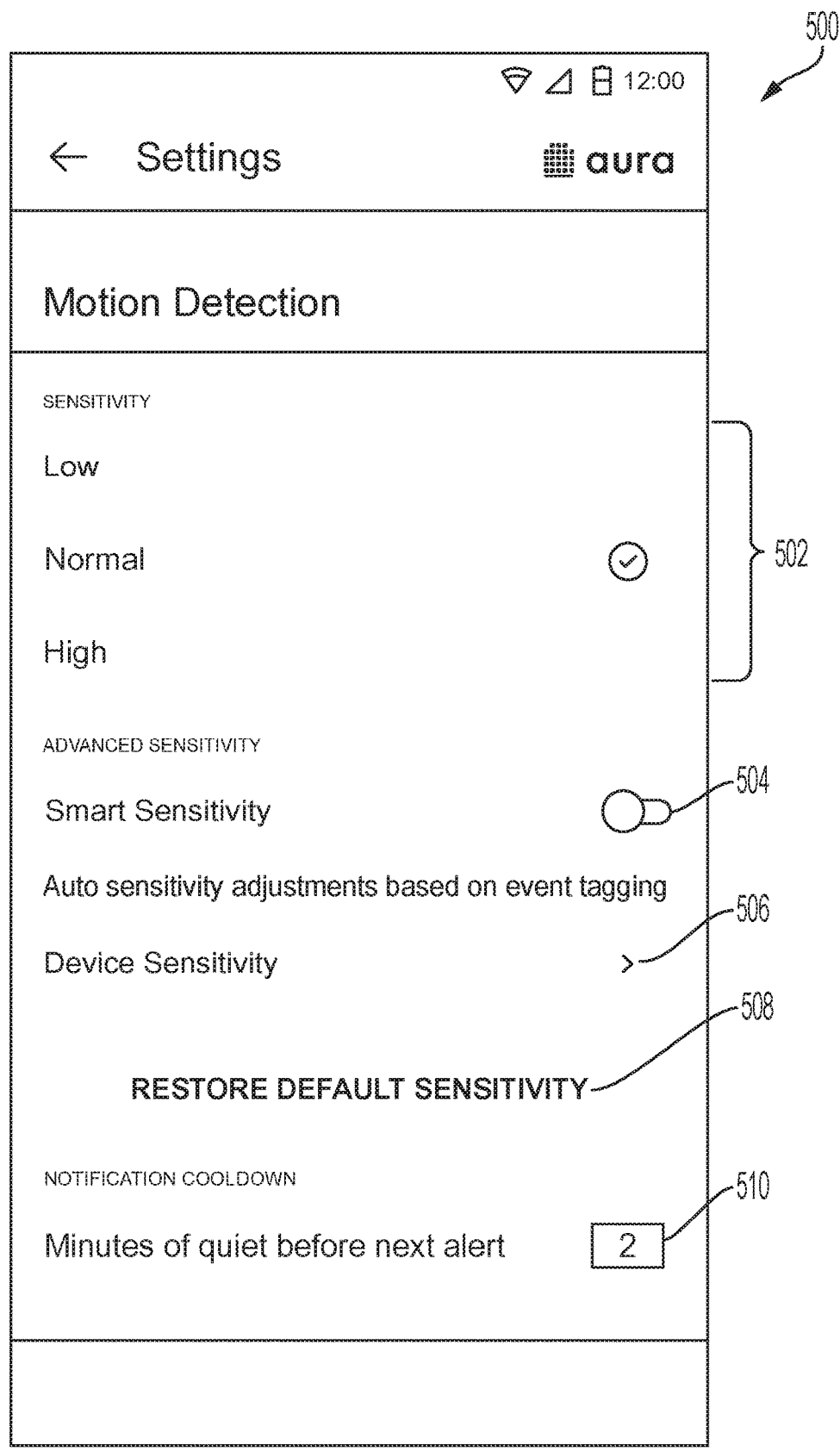
FIGS. 5A, 5B, 5C, 5D and 5E are diagrams showing example user interfaces provided by a motion detection system.
Figure 5B:
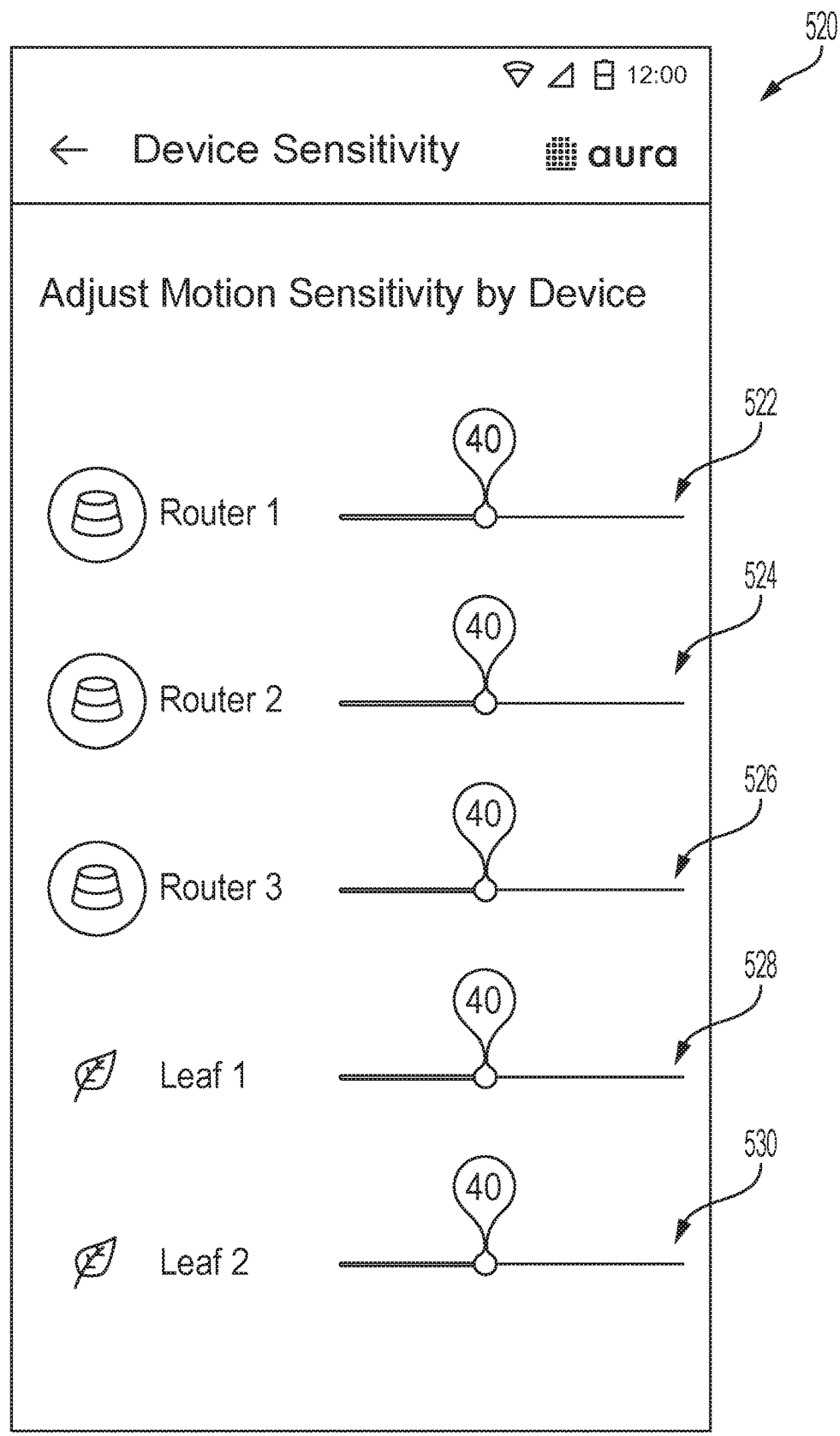

The example user interface 500 shown in FIG. 5A includes an element 502 that allows the user to select the overall sensitivity of the motion detection system. As shown in FIG. 5, the element 502 allows the user to designate low, normal or high sensitivity for the motion detection system. The sensitivity setting provided through element 502 may be used, for example, as an initial sensitivity setting for all links used by the motion detection system.

The example user interface 500 shown in FIG. 5A also includes an element 504 that allows the user to turn on (or enable) a "smart sensitivity" feature in the motion detection system. When the smart sensitivity feature is activated, the motion detection system automatically adjusts sensitivity (e.g., sensitivity settings of wireless communication links or devices) based on event tagging. For example, the user may be asked to tag motion detection events as true or false (e.g., as shown in FIG. 5E or otherwise), and the motion detection system can adjust sensitivity settings based on the tags provided by the user.

The example user interface 500 shown in FIG. 5A also includes an element 506 that allows the user to open another user interface that controls device sensitivity. In the particular example shown in FIG. 5A, selecting the element 508 opens the user interface 520 shown in FIG. 5B, which allows the user to adjust a sensitivity level for any of the five nodes in the wireless network.

The example user interface 500 shown in FIG. 5A also includes an element 508 that allows the user to restore default sensitivity settings in the motion detection system. The default sensitivity settings can include, for example, a set of default values provided in an initial installation of the motion detection system.

The example user interface 500 shown in FIG. 5A also includes an element 510 that allows the user to specify a "notification cooldown" duration. The "notification cooldown" duration is the amount of time that the motion detection system will wait between notifications to the user. In the example shown, a 2-minute notification cooldown period has been specified in the user interface element 510. The "notification cooldown" duration may be specified in another manner (e.g., with a different type of interface, different units of time, with a default value, etc.).

The example user interface 520 shown in FIG. 5B includes five control widgets 522, 524, 526, 528, 530 that allow the user to indicate a sensitivity level for each wireless communication device used by the motion detection system. The example control widgets shown in FIG. 5B are sliders; other types of widgets may be used. As shown in FIG. 5B, the control widget 522 allows the user to adjust (increase or decrease) the sensitivity level for "Router 1" (e.g., node 402A shown in FIG. 4); the control widget 524 allows the user to adjust (increase or decrease) the sensitivity level for "Router 2" (e.g., node 402B shown in FIG. 4); the control widget 526 allows the user to adjust (increase or decrease) the sensitivity level for "Router 3" (e.g., node 402C shown in FIG. 4); and the control widgets 528, 530 allow the user to adjust (increase or decrease) the respective sensitivity levels for "Leaf 1" and "Leaf 2" (e.g., nodes 402D, 402E shown in FIG. 4).

Figure 5C:
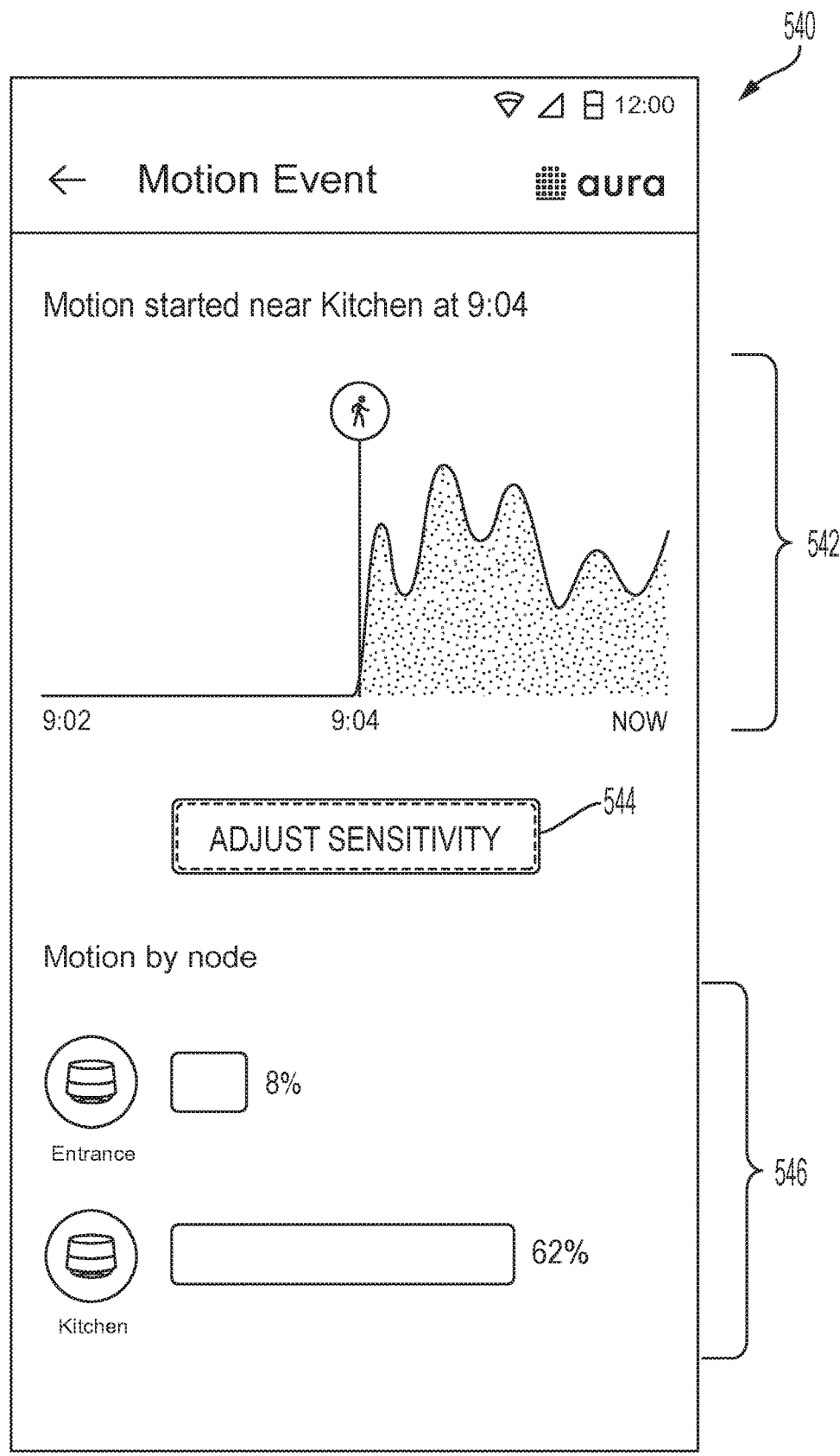

The example user interface 540 shown in FIG. 5C includes an element 542 that displays motion data generated by the motion detection system. As shown in FIG. 5C, the element 542 includes a horizontal timeline and a plot of motion data indicating a degree of motion detected by the motion detection system over time. In the example shown, the user is notified that the detected motion started near a particular location (the kitchen) at a particular time (9:04), and the relative degree of motion detected is indicated by the height of the curve at each time point.

The example user interface 540 shown in FIG. 5C also includes an element 546 that displays the relative degree of motion detected by each node of the motion detection system. In particular, the element 546 indicates that 8% of the motion was detected by the "Entrance" node (e.g., an AP installed at the home entry) while 62% of the motion was detected by the "Kitchen" node (e.g., an AP installed in the kitchen). The data provided in the elements 542, 546 can help the user correlate the motion detection event with the user's observation or knowledge, and to determine whether the motion detection event was true or false. In some instances, the data provided in the elements 542, 546 helps the user determine whether a sensitivity level associated with one of the nodes should be adjusted.

The example user interface 540 shown in FIG. 5C also includes an element 544 that allows the user to open another user interface that controls device sensitivity. In the particular example shown in FIG. 5C, selecting the element 544 opens the user interface 560 shown in FIG. 5D, which allows the user to adjust a sensitivity level for the "Kitchen" node, the "Leaf 1" node or both.

Figure 5D:
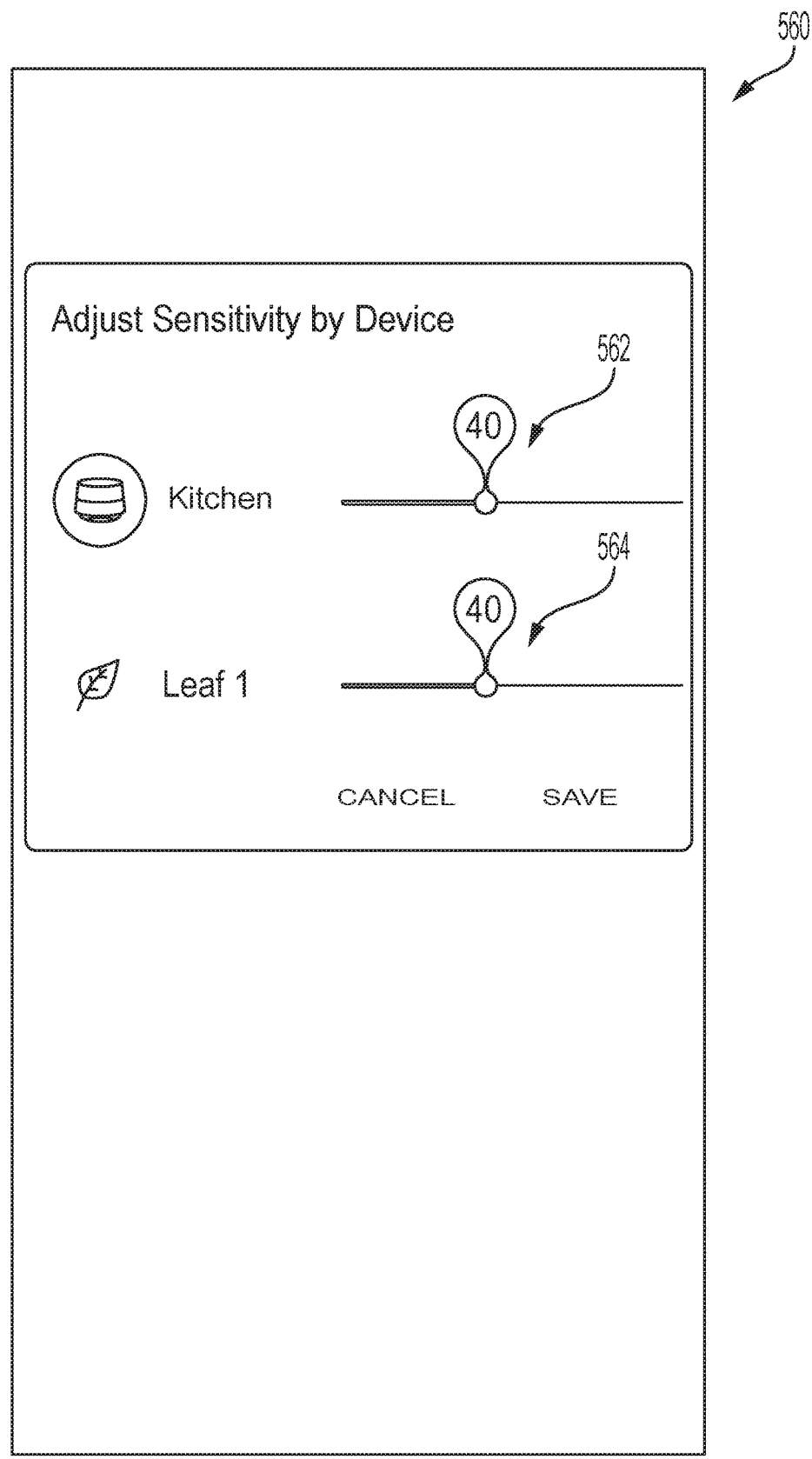
Figure 5E:
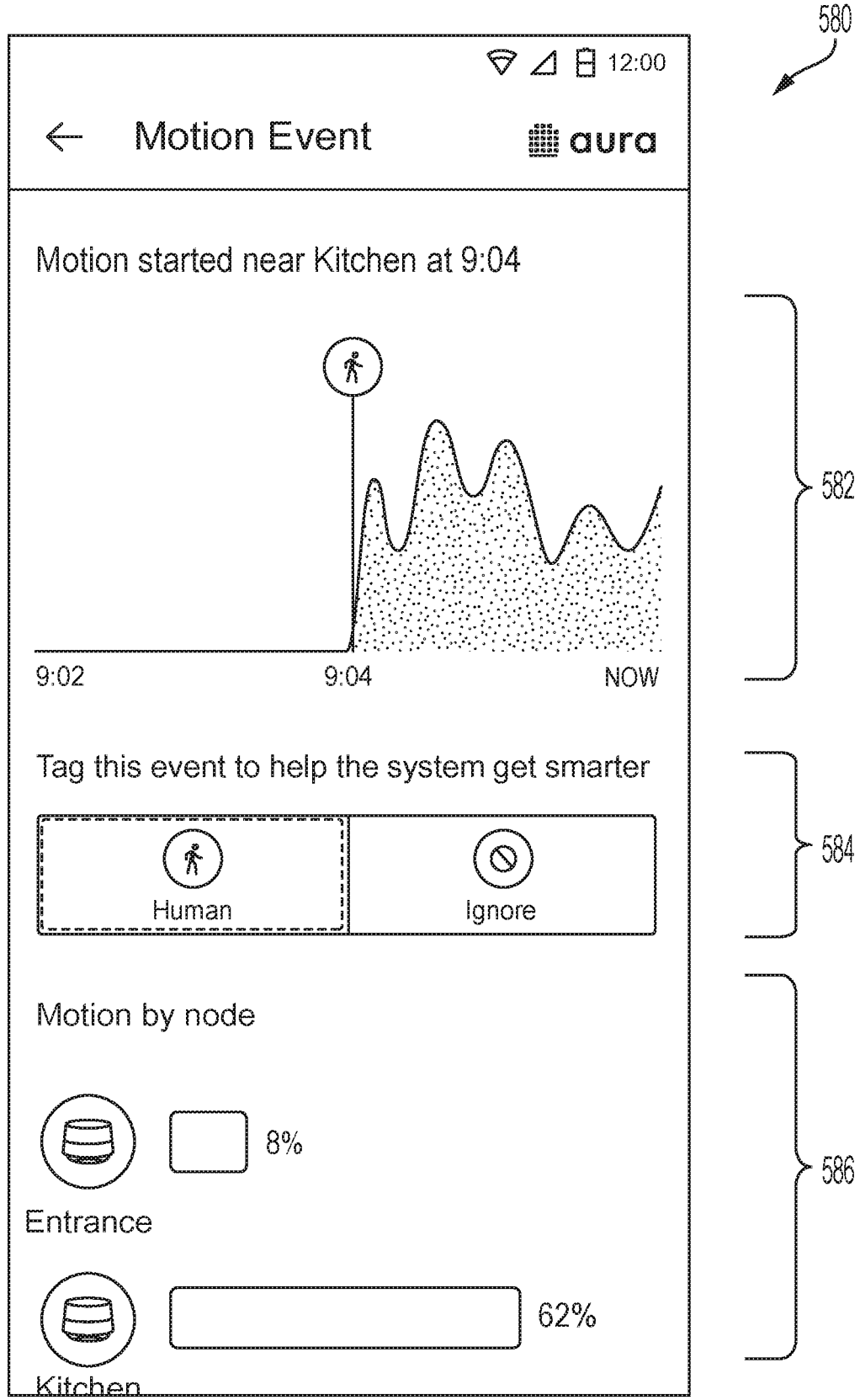

The example user interface 560 shown in FIG. 5D includes two control widgets 562, 564 that allow the user to indicate a sensitivity level for two wireless communication devices used by the motion detection system. The example control widgets shown in FIG. 5D are sliders; other types of widgets may be used. As shown in FIG. 5D, the control widget 562 allows the user to adjust (increase or decrease) the sensitivity level for the "Kitchen" device (e.g., node 402A shown in FIG. 4); and the control widget 564 allows the user to adjust (increase or decrease) the sensitivity level for "Leaf 1" device (e.g., node 402D shown in FIG. 4).

The example user interface 580 shown in FIG. 5E includes an element 582 that displays motion data generated by the motion detection system. The element 582 shown in FIG. 5E is the same as the element 542 in FIG. 5C.

The example user interface 580 shown in FIG. 5E also includes an element 586 that displays the relative degree of motion detected by each node of the motion detection system. The element 586 shown in FIG. 5E is the same as the element 546 in FIG. 5C.

The example user interface 580 shown in FIG. 5E also includes an element 584 that allows the user to tag a motion detection event. In particular, the element 584 allows the user to select "human" or "ignore." In some cases, a user interface element allows a user to tag a motion detection event in another manner, for example, through a different type of widget, with different types of tags, etc. The example element 584 allows the user to select "human," to indicate that the motion displayed in the element 582 was caused by a human; and the example element 584 alternatively allows the user to select "ignore," to indicate that the motion was not caused by a human. In this example, motion by a human is a type of true motion event, which the user wants the motion detection system to provide alerts for; whereas motion not caused by a human is a type of false motion event the user does not want the motion detection system to provide alerts for. In other examples, a motion detection system may define or categorize other types of motion events (e.g., true, false, otherwise).

Figure 6:
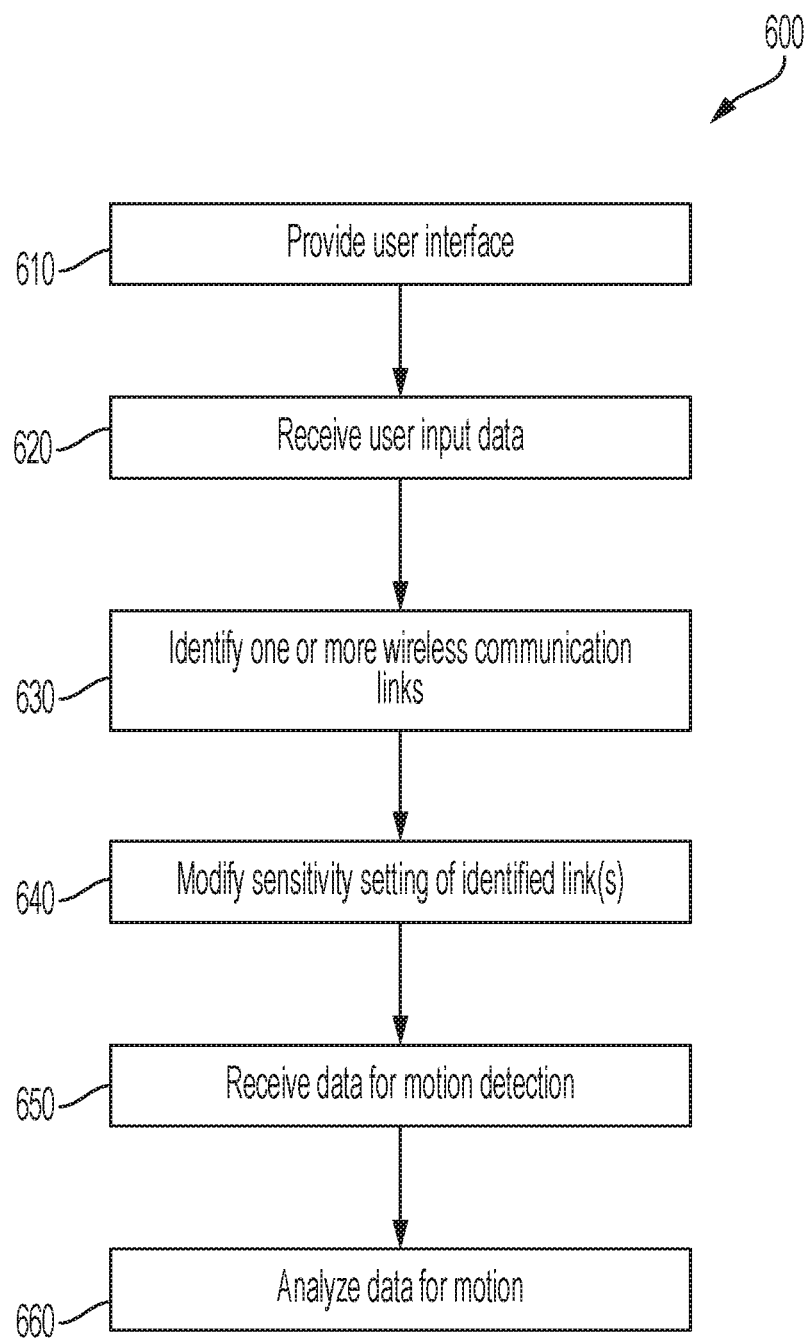
FIG. 6 is a flow chart showing an example process performed by a motion detection system.

FIG. 6 is a flow chart showing an example process 600 performed, for example, by a motion detection system. The motion detection system can process information based on wireless signals transmitted (e.g., on wireless links between wireless communication devices) through a space to detect motion of objects in the space (e.g., as described with respect to FIGS. 1 and 2, or otherwise). Operations of the process 600 may be performed by a remote computer system (e.g., a server in the cloud), a user device (e.g., a user device that collects user input), a wireless communication device (e.g., one or more of the wireless communication devices), or another type of system. For example, operations in the example process 600 may be performed by one or more of the example wireless communication devices 302A, 302B, 302C in FIG. 3 or by one or more of the nodes 402A, 402B, 402C, 402D, 402E in FIG. 4 to adjust settings in the motion detection system (e.g., based on user input data and possibly other information) and to detect whether motion has occurred in the space (e.g., based on the adjusted settings).

The example process 600 may include additional or different operations, and the operations may be performed in the order shown or in another order. In some cases, one or more of the operations shown in FIG. 6 can be implemented as processes that include multiple operations, sub-processes or other types of routines. In some cases, operations can be combined, performed in another order, performed in parallel, iterated, or otherwise repeated or performed in another manner.

In the example process 600 show in FIG. 6, the motion detection system has a sensitivity setting associated with each of the wireless communication links that are used for motion detection. For example, the sensitivity setting may specify a threshold level (e.g., a perturbation threshold) in a motion detection algorithm, such that the motion detection algorithm determines that motion has occurred when observed activity (e.g., channel perturbation) exceeding the threshold level is detected. A sensitivity setting may be or include other types of values that control the sensitivity of a motion detection system to the data obtained from each of the wireless communication links. The example process 600 may be used to modify one or more of the sensitivity settings, for example, to improve the accuracy of the output provided by the motion detection system, to improve the relevance of notifications generated based on the output, or to otherwise improve the motion detection system.

At 610, a user interface is provided. The user interface is provided by the motion detection system for display on a user device. The user interface provided by the motion detection system can be a graphical user interface, for example, of the type shown in any of FIGS. 5A, 5B, 5C, 5D, 5E; or another type of user interface may be provided. The motion detection system can provide the user interface for display on a user device, for example, by sending data, instructions and/or other information to the user device over a communication link. As an example, the motion detection system can be implemented (e.g., at least partially) as a software system running on one of the wireless communication devices, which can send the user interface to a user's mobile device over a local wireless network connection, over the Internet, or otherwise. As another example, the motion detection system can be implemented (e.g., at least partially) as a software system running on the user device, which render the user interface on a display element of the user device.

At 620, user input data is received. The user input data is obtained through the user interface provided at 610. For instance, the user device may display a graphical user interface on a touchscreen and generate the user input data based on the user's interactions with the touchscreen. The user device then provides the user input data to the motion detection system. In examples where the motion detection system is implemented (e.g., at least partially) as a software system running on one of the wireless communication devices, the user's mobile device can send the user input data to the wireless communication device over a local wireless network connection, over the Internet, or otherwise.

At 630, one or more wireless communication links are identified; and at 640, the sensitivity settings of the identified links are modified. Each of the identified wireless communication links is provided by a pair of the wireless communication devices. For example, the wireless communication links may be of the type shown in FIGS. 3 and 4.

In the example process 600 shown in FIG. 6, the wireless communication links are identified at 630 and the sensitivity settings are modified at 640 based on the user input data received by the motion detection system at 620. Modifying the sensitivity setting at 640 assigns an updated value to the sensitivity setting associated with the wireless communication link identified at 630. For example, the motion detection system may automatically increase or decrease the sensitivity setting value based on a tagged motion event. As another example, the sensitivity level (e.g., a value between 1-10, between 1-100, or another type of value) specified by a user interaction with a control widget can be translated to a sensitivity setting value used internally by the motion detection system (e.g., a threshold value used by a motion detection algorithm or another type of setting). Generally, modifying the value of the sensitivity setting can increase or decrease a sensitivity of the motion detection system to motion in the space.

In some implementations, the user input data includes a sensitivity level specified by a user interaction with the user interface. For instance, the user interface can include a control widget (e.g., of the type shown in FIGS. 5B and 5D, or another type of control widget), and the sensitivity setting can be based on a sensitivity level specified by a user interaction with the control widget. In the example shown in FIG. 5B, the user interaction specifies a sensitivity level by the slider position.

In some cases, the user interface includes one or more control widgets each associated with a particular wireless communication device in the user interface, so that the user can specify the sensitivity level for an individual wireless communication device (e.g., as shown in FIGS. 5B and 5D). In such cases, the wireless communication links are identified at 630 can be (e.g., one, some or all) of the wireless communication links connected to a device associated with the control widget adjusted by the user.

In some cases, the user interface includes one or more control widgets each associated with a particular wireless communication link in the user interface, so that the user can specify the sensitivity level for an individual wireless communication link (e.g., the user may be able to directly control the sensitivity level for each of the wireless communication links 322A, 322B, 322C in FIG. 3). In such cases, the wireless communication links are identified at 630 by their association with the control widget adjusted by the user.

In some implementations, the user input data includes an indication of a false motion detection (e.g., using the "ignore" button in the example interface 580 shown in FIG. 5E), and the wireless communication link is identified at 630 based on the indication of the false motion detection. In such cases, adjusting the sensitivity setting at 640 can reduce the identified wireless communication link's sensitivity to motion in the space. For example, the motion detection system may reduce the sensitivity setting of some or all wireless communication links that detected the false motion event. The sensitivity settings may be reduced uniformly, or in proportion to the respective perturbation levels they detected.

In some implementations, the user input data includes an indication of a true motion detection (e.g., using the "human" button in the example interface 580 shown in FIG. 5E), and the wireless communication link is identified at 630 based on the indication of the true motion detection. In such cases, adjusting the sensitivity setting at 640 can increase the identified wireless communication link's sensitivity to motion in the space. For example, the motion detection system may increase the sensitivity setting of some or all wireless communication links that detected the true motion event.

At 650, data for motion detection is received. The data are based on wireless signals communicated through a space on one or more wireless communication links provided by pairs of wireless communication devices. The data for motion detection may be received, for example, from one or more of the wireless communication devices. The motion detection data may include, or be based on, channel information for each wireless communication link.

In some instances, the motion detection data received at 650 includes channel information generated based on wireless signals communicated on one or more of the wireless communication links identified at 630. The channel information may include, for example, channel responses, beamforming state information, or other types of channel information that can be used to detect motion. The channel information may include channel perturbation values. For example, a time series of channel perturbation values for each wireless communication link may be generated from the channel information collected over time.

At 660, the data is analyzed to determine whether motion occurred in the space. For example, the motion detection system may detect motion of an object in the space when the object moves in the signal path of one or more of the wireless communication links. The motion may be detected based on the value of the sensitivity setting, as modified at 640. For example, the motion detection system may apply the modified sensitivity setting (e.g., as a threshold, a filter, or another metric) to motion detection data obtained from wireless signals communicated on one or more of the wireless communication links identified at 630. In some implementations, channel perturbations (e.g., a time series of channel perturbation values for one or more wireless communication links) or other channel information may be analyzed to detect whether motion has occurred in the space, to determine a relative location of the detected motion, or both.

In some instances, the motion detection system does not detect motion of an object because the detected perturbation level is below a threshold level specified by the sensitivity setting. As such, modifying the sensitivity setting at 640 may reduce sensitivity of the motion detection system and thereby reduce the occurrence of motion detection events. In some instances, the motion detection system does detect motion of an object because the detected perturbation level is above a threshold level specified by the sensitivity setting. As such, modifying the sensitivity setting at 640 may increase sensitivity of the motion detection system and thereby increase the occurrence of motion detection events.

When motion is detected, the motion detection system can provide a notification to the user. For example, the motion detection system may provide a user interface of the type shown in FIGS. 5C and 5E, or another type of user interface. In some cases, one or more operations of the process 600 may be repeated based on user input data obtained through the user interface.

Figure 7:
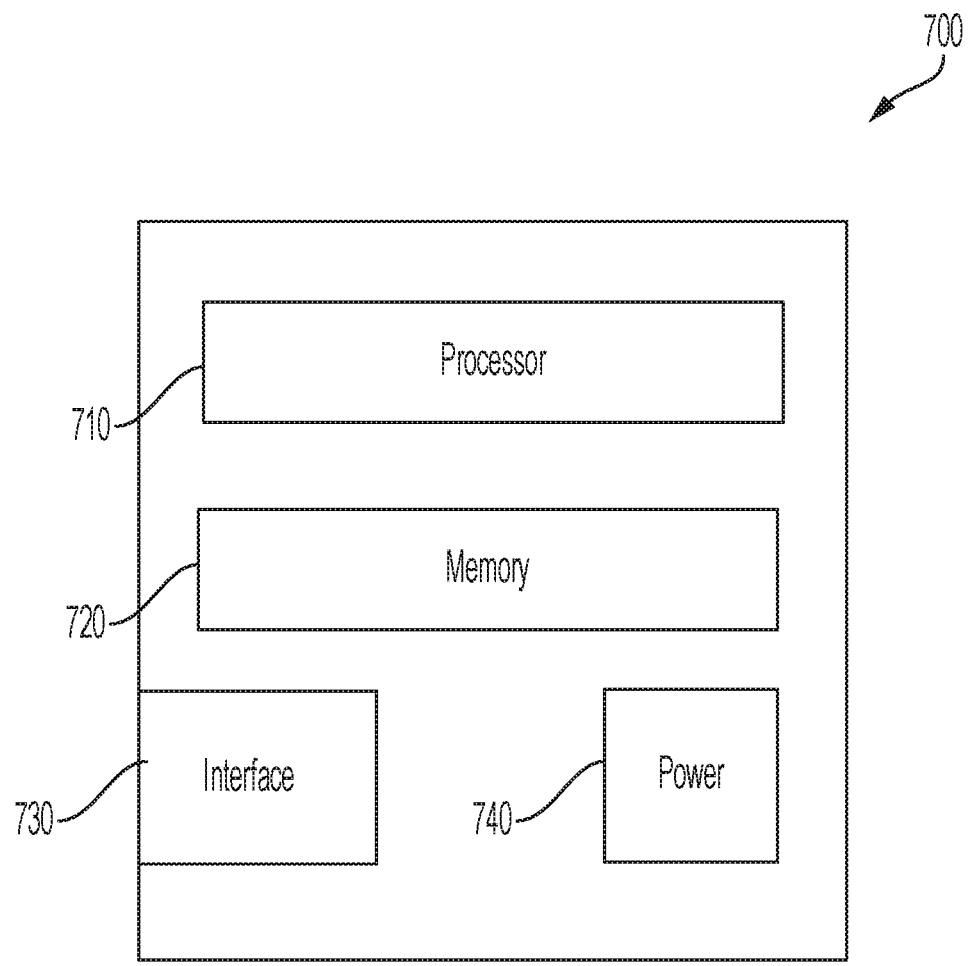
FIG. 7 is a block diagram showing an example wireless communication device.

FIG. 7 is a block diagram showing an example wireless communication device 700. As shown in FIG. 7, the example wireless communication device 700 includes an interface 730, a processor 710, a memory 720, and a power unit 740. A wireless communication device (e.g., any of the wireless communication devices 102A, 102B, 102C in FIG. 1) may include additional or different components, and the wireless communication device 700 may be configured to operate as described with respect to the examples above. In some implementations, the interface 730, processor 710, memory 720, and power unit 740 of a wireless communication device are housed together in a common housing or other assembly. In some implementations, one or more of the components of a wireless communication device can be housed separately, for example, in a separate housing or other assembly.

The example interface 730 can communicate (receive, transmit, or both) wireless signals. For example, the interface 730 may be configured to communicate radio frequency (RF) signals formatted according to a wireless communication standard (e.g., Wi-Fi, 4G, 5G, Bluetooth, etc.). In some implementations, the example interface 730 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 710 can execute instructions, for example, to generate output data based on data inputs. The instructions can include programs, codes, scripts, modules, or other types of data stored in memory 720. Additionally or alternatively, the instructions can be encoded as pre-programmed or re-programmable logic circuits, logic gates, or other types of hardware or firmware components or modules. The processor 710 may be or include a general-purpose microprocessor, as a specialized co-processor or another type of data processing apparatus. In some cases, the processor 710 performs high level operation of the wireless communication device 700. For example, the processor 710 may be configured to execute or interpret software, scripts, programs, functions, executables, or other instructions stored in the memory 720. In some implementations, the processor 710 be included in the interface 730 or another component of the wireless communication device 700.

The example memory 720 may include computer-readable storage media, for example, a volatile memory device, a non-volatile memory device, or both. The memory 720 may include one or more read-only memory devices, random-access memory devices, buffer memory devices, or a combination of these and other types of memory devices. In some instances, one or more components of the memory can be integrated or otherwise associated with another component of the wireless communication device 700. The memory 720 may store instructions that are executable by the processor 710. For example, the instructions may include instructions to perform one or more of the operations in the example process 600 shown in FIG. 6.

The example power unit 740 provides power to the other components of the wireless communication device 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and coverts the external power signal to an internal power signal conditioned for a component of the wireless communication device 700. The power unit 720 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, a sensitivity setting is adjusted in a motion detection system.

In a first example, a user interface is provided by a motion detection system, and user input is obtained through the user interface. A wireless communication link is identified based on the user input; the wireless communication link is provided by a first wireless communication device and a second wireless communication device. Based on the user input, a value is assigned to a sensitivity setting associated with the wireless communication link in the motion detection system. The motion detection system obtains data for motion detection based on wireless signals communicated through a space on the wireless communication link. Motion of an object in the space is detected based on the data and the value of the sensitivity setting.

Implementations of the first example may include one or more of the following features. The object resides in a signal path of the wireless communication link between the first and second wireless communication devices.

Implementations of the first example may include one or more of the following features. The user input can include a sensitivity level specified by a user interaction with the user interface. The user interface can include a control widget, and the sensitivity level can be specified by a user interaction with the control widget. The control widget can be associated with the first wireless communication device in the user interface, and the user interaction can specify the sensitivity level for the first wireless communication device. The control widget can be associated with the wireless communication link in the user interface, and the user interaction can specify the sensitivity level for the wireless communication link.

Implementations of the first example may include one or more of the following features. The user interface can include a plurality of control widgets, and the user input can include sensitivity levels specified by user interactions with the plurality of control widgets. A plurality of wireless communication links can be identified based on the user input. Values can be assigned to respective sensitivity settings in the motion detection system based on the sensitivity levels, wherein the sensitivity settings are associated with the respective wireless communication links. The data for motion detection can be based on wireless signals communicated through the space on one or more of the plurality of wireless communication links. Motion can be detected based on the data and the values of one or more of the sensitivity settings.

Implementations of the first example may include one or more of the following features. The user interface can be provided by the motion detection system. The user interface can be provided to a mobile device for display on the mobile device.

Implementations of the first example may include one or more of the following features. The user input can include an indication of a false motion detection, the wireless communication link can be identified based on the indication of the false motion detection, and assigning the value to the sensitivity setting can reduce the identified wireless communication link's sensitivity to motion in the space.

Implementations of the first example may include one or more of the following features. A plurality of wireless communication links can be identified based on the user input, wherein each of the plurality of wireless communication links is provided by a respective pair of wireless communication devices. Values can be assigned to respective sensitivity settings in the motion detection system based on the user input, wherein the sensitivity settings are associated with the respective wireless communication links. The data for motion detection can be based on wireless signals communicated through the space on one or more of the plurality of wireless communication links. Motion can be detected based on the data and the values of one or more of the sensitivity settings. The user input can include an indication of a false motion detection, the plurality of wireless communication links can be identified based on the indication of the false motion detection, and assigning values to the respective sensitivity settings can reduce the identified plurality of wireless communication links' sensitivity to motion in the space.

Implementations of the first example may include one or more of the following features. The value of the sensitivity setting can specify a threshold level in a motion detection algorithm, and detecting motion of the object in the space can include, based on the data, detecting a perturbation above the threshold level. Assigning the value to the sensitivity setting can increase a sensitivity of the motion detection system to motion in the space. Assigning the value to the sensitivity setting can decrease a sensitivity of the motion detection system to motion in the space.

In a second example, a non-transitory computer-readable medium stores instructions that are operable when executed by data processing apparatus to perform one or more operations of the first example. In a third example, a system includes a user interface device, a plurality of wireless communication devices, and a computer device configured to perform one or more operations of the first example.

Implementations of the third example may include one or more of the following features. One of the wireless communication devices can be or include the computer device. One of the wireless communication devices can be or include the user interface device. The computer device can be located remote from the wireless communication devices and/or the user interface device.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
receiving user input data obtained through a user interface provided by a motion detection system;
identifying a wireless communication link based on the user input data, wherein the wireless communication link is provided by a first wireless communication device and a second wireless communication device, and the motion detection system specifies a sensitivity setting for detecting motion based on wireless signals communicated on the wireless communication link;
assigning a value to the sensitivity setting based on the user input data;
receiving data for motion detection based on wireless signals communicated through a space on the wireless communication link; and
detecting motion of an object in the space based on the data and the value of the sensitivity setting.

2. The method of claim 1, wherein the user input data comprises a sensitivity level specified by a user interaction with the user interface.

3. The method of claim 2, wherein the user interface comprises a control widget in the user interface, and the sensitivity level is specified by the user interaction with the control widget.

4. The method of claim 3, wherein the control widget is associated with the first wireless communication device in the user interface, the user interaction specifies the sensitivity level for the first wireless communication device.

5. The method of claim 3, wherein the control widget is associated with the wireless communication link in the user interface, and the user interaction specifies the sensitivity level for the wireless communication link.

6. The method of claim 1, wherein the user interface comprises a plurality of control widgets, the user input data comprises sensitivity levels specified by user interactions with the plurality of control widgets, and the method comprises:
identifying a plurality of wireless communication links based on the user input data;
assigning values to respective sensitivity settings in the motion detection system based on the sensitivity levels, wherein the sensitivity settings are associated with the respective wireless communication links;
receiving data for motion detection based on wireless signals communicated through the space on one or more of the plurality of wireless communication links; and
detecting motion in the space based on the data and the values of one or more of the sensitivity settings.

7. The method of claim 1, comprising providing the user interface for display on a mobile device.

8. The method of claim 1, wherein the user input data comprises an indication of a false motion detection, the wireless communication link is identified based on the indication of the false motion detection, and assigning the value to the sensitivity setting comprises reducing a sensitivity of the identified wireless communication link.

9. The method of claim 1, wherein the method comprises:
identifying a plurality of wireless communication links based on the user input data, wherein each of the plurality of wireless communication links is provided by a respective pair of wireless communication devices;
assigning values to respective sensitivity settings in the motion detection system based on the user input data, wherein the sensitivity settings are associated with the respective wireless communication links;
receiving data for motion detection based on wireless signals communicated through the space on the plurality of wireless communication links; and
detecting motion in the space based on the data and the values of the sensitivity settings.

10. The method of claim 9, wherein the user input data comprises an indication of a false motion detection, the plurality of wireless communication links are identified based on the indication of the false motion detection, assigning values to the respective sensitivity settings comprises reducing the sensitivity of the identified plurality of wireless communication links.

11. The method of claim 1, wherein the value of the sensitivity setting specifies a threshold level in a motion detection algorithm, and detecting motion of the object in the space comprises, based on the data, detecting a perturbation above the threshold level.

12. The method of claim 1, wherein assigning the value to the sensitivity setting increases a sensitivity of the motion detection system to motion in the space.

13. The method of claim 1, wherein assigning the value to the sensitivity setting decreases a sensitivity of the motion detection system to motion in the space.

14. A non-transitory computer-readable medium comprising instructions that are operable, when executed by data processing apparatus, to perform operations comprising:
receiving user input data obtained through a user interface provided by a motion detection system;
identifying a wireless communication link based on the user input data, wherein the wireless communication link is provided by a first wireless communication device and a second wireless communication device, and the motion detection system specifies a sensitivity setting for detecting motion based on wireless signals communicated on the wireless communication link;
assigning a value to the sensitivity setting based on the user input data;
receiving data for motion detection based on wireless signals communicated through a space on the wireless communication link; and
detecting motion of an object in the space based on the data and the value of the sensitivity setting.

15. The computer-readable medium of claim 14, wherein the user input data comprises a sensitivity level specified by a user interaction with the user interface.

16. The computer-readable medium of claim 14, wherein the user interface comprises a plurality of control widgets, the user input data comprises sensitivity levels specified by user interactions with the plurality of control widgets, and the operations comprise:
identifying a plurality of wireless communication links based on the user input data;
assigning values to respective sensitivity settings in the motion detection system based on the sensitivity levels, wherein the sensitivity settings are associated with the respective wireless communication links;

receiving data for motion detection based on wireless signals communicated through the space on one or more of the plurality of wireless communication links; and detecting motion in the space based on the data and the values of one or more of the sensitivity settings.

17. The computer-readable medium of claim 14, wherein the user input data comprises an indication of a false motion detection, the wireless communication link is identified based on the indication of the false motion detection, and assigning the value to the sensitivity setting comprises reducing a sensitivity of the identified wireless communication link.

18. The computer-readable medium of claim 14, wherein the operations comprise:
identifying a plurality of wireless communication links based on the user input data, wherein each of the plurality of wireless communication links is provided by a respective pair of wireless communication devices;
assigning values to respective sensitivity settings in the motion detection system based on the user input data, wherein the sensitivity settings are associated with the respective wireless communication links;
receiving data for motion detection based on wireless signals communicated through the space on the plurality of wireless communication links; and
detecting motion in the space based on the data and the values of the sensitivity settings.

19. The computer-readable medium of claim 14, wherein the value of the sensitivity setting specifies a threshold level in a motion detection algorithm, and detecting motion of the object in the space comprises, based on the data, detecting a perturbation above the threshold level.

20. A system comprising:
a plurality of wireless communication devices comprising first and second wireless communication devices;
a user interface device;
a computer device comprising one or more processors operable to perform operations comprising:
providing a user interface for display on the user interface device;
receiving user input data obtained through the user interface on the user interface device;
identifying a wireless communication link based on the user input data, wherein the wireless communication link is provided by the first and second wireless communication devices, and the motion detection system specifies a sensitivity setting for detecting motion based on wireless signals communicated on the wireless communication link;
assigning a value to the sensitivity setting associated with the wireless communication link based on the user input data;
receiving data for motion detection based on wireless signals communicated through a space on the wireless communication link; and
detecting motion of an object in the space based on the data and the value of the sensitivity setting.

21. The system of claim 20, wherein the user input data comprises a sensitivity level specified by a user interaction with the user interface.

22. The system of claim 20, wherein the user interface device is a mobile device that communicates wirelessly with the computer device.

23. The system of claim 20, wherein the user interface comprises a plurality of control widgets, the user input data comprises sensitivity levels specified by user interactions with the plurality of control widgets, and the operations comprise:
identifying a plurality of wireless communication links based on the user input data;
assigning values to respective sensitivity settings in the motion detection system based on the sensitivity levels, wherein the sensitivity settings are associated with the respective wireless communication links;
receiving data for motion detection based on wireless signals communicated through the space on one or more of the plurality of wireless communication links; and
detecting motion in the space based on the data and the values of one or more of the sensitivity settings.

24. The system of claim 20, wherein the user input data comprises an indication of a false motion detection, the wireless communication link is identified based on the indication of the false motion detection, and assigning the value to the sensitivity setting comprises reducing a sensitivity of the identified wireless communication link.

25. The system of claim 20, wherein the operations comprise:
identifying a plurality of wireless communication links based on the user input data, wherein each of the plurality of wireless communication links is provided by a respective pair of the wireless communication devices;
assigning values to respective sensitivity settings in the motion detection system based on the user input data, wherein the sensitivity settings are associated with the respective wireless communication links;
receiving data for motion detection based on wireless signals communicated through the space on the plurality of wireless communication links; and
detecting motion in the space based on the data and the values of the sensitivity settings.

26. The system of claim 20, wherein the value of the sensitivity setting specifies a threshold level in a motion detection algorithm, and detecting motion of the object in the space comprises, based on the data, detecting a perturbation above the threshold level.

27. The system of claim 20, wherein one of the wireless communication devices is the computer device.

28. The system of claim 20, wherein one of the wireless communication devices is the user interface device.

29. The system of claim 20, wherein the computer device is remote from the wireless communication devices and the user interface device.

* * * * *